United States Patent

[11] 3,628,377

[72] Inventor David E. Weiss
 1408 Mellon Road, Wyncote, Pa. 19095
[21] Appl. No. 844,431
[22] Filed July 24, 1969
[45] Patented Dec. 21, 1971

[54] STRAIN LEVEL COUNTER
 2 Claims, 2 Drawing Figs.
[52] U.S. Cl. .................................................. 73/91
[51] Int. Cl. ............................................. G01n 3/32
[50] Field of Search ........................................ 73/91, 90, 93

[56] References Cited
 UNITED STATES PATENTS
 3,241,359 3/1966 Gelerum ..................... 73/141 A
 3,375,708 4/1968 Preston ...................... 73/89 X
 3,441,718 4/1969 Hatherell et al. ............ 73/91 X Primary Examiner—Jerry W. Myracle
Attorneys—E. J. Brower and A. W. Collins ABSTRACT: Present invention relates to novel and improved apparatus for indicating and/or recording the history of the magnitude and frequency of strains to which a structure such as aircraft wing is subjected during its service life. The apparatus includes a ferromagnetic rod which is secured at one point to the structure to be monitored for fatigue and the coil assembly of a transducer which is secured at another point on the structure. Application of tensile and/or compressive strains to the structure varies the axial disposition of the rod in the coil assembly and the electromagnetic coupling between coils of the transducer. The resulting electrical pulses developed by the transducer drive-counting devices through high-gain differential amplifiers provide a record of the number of applied strains that exceed preselected reference levels.

INVENTOR.
DAVID E. WEISS

BY

*Arthur L. Collins*

ATTORNEY

STRAIN LEVEL COUNTER

The invention described herein may be manufactured and used by or for the Government of the United States of America for governmental purposes without the payment of any royalties thereon or therefor.

The history of the magnitude and frequency of strains to which critical portions of aircraft and other structures have been subjected is often invaluable in determining the remaining safe useful life or the structure. Without information of this kind, many aircraft and other structural devices are often withdrawn from service prematurely. Moreover, data of this kind is often highly useful in providing guide lines for changes, modifications and improvements in the design of the structure. Although various devices have been used in the past to accumulate such data, considerable difficulty has been experienced heretofore in devising apparatus which provides the desired information in a practical and effective manner.

It is therefore a principal object of the invention to provide novel and improved apparatus which provides strain fatigue data on a structure in a reliable way.

It is a further object of the invention to provide novel and improved fatigue recording apparatus for a structure which is installed on the structure at the time of its manufacture and which continuously records the strains to which the structure is subjected throughout the life of the structure.

It is a further object of the invention to provide novel and improved fatigue recording apparatus for a structure that utilizes a linear differential transformer-type transducer to sense strains applied to the structure.

It is a further object of the invention to provide novel and improved fatigue-recording apparatus for a structure that effectively suppresses spurious readings that are not produced by strains applied to the structure.

Other objects and many of the attendant advantages of this invention will be readily appreciated as the same becomes better understood by reference to the following detailed description when considered in connection with the accompanying drawing wherein.

Figure 1:
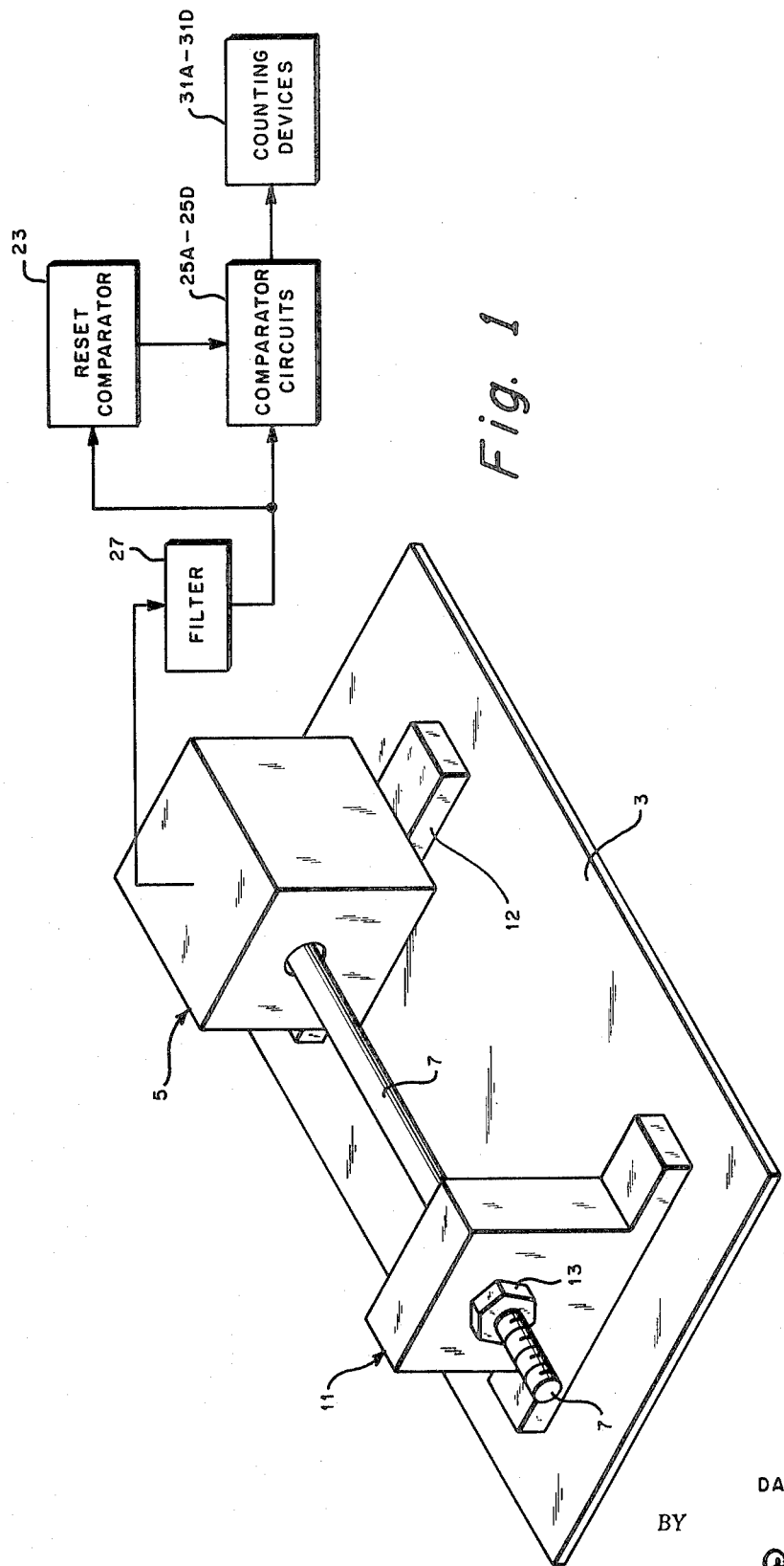
FIG. 1 is a diagrammatic view of a preferred embodiment of the invention as it might be applied to the critical wing root area of an aircraft.
Figure 2:
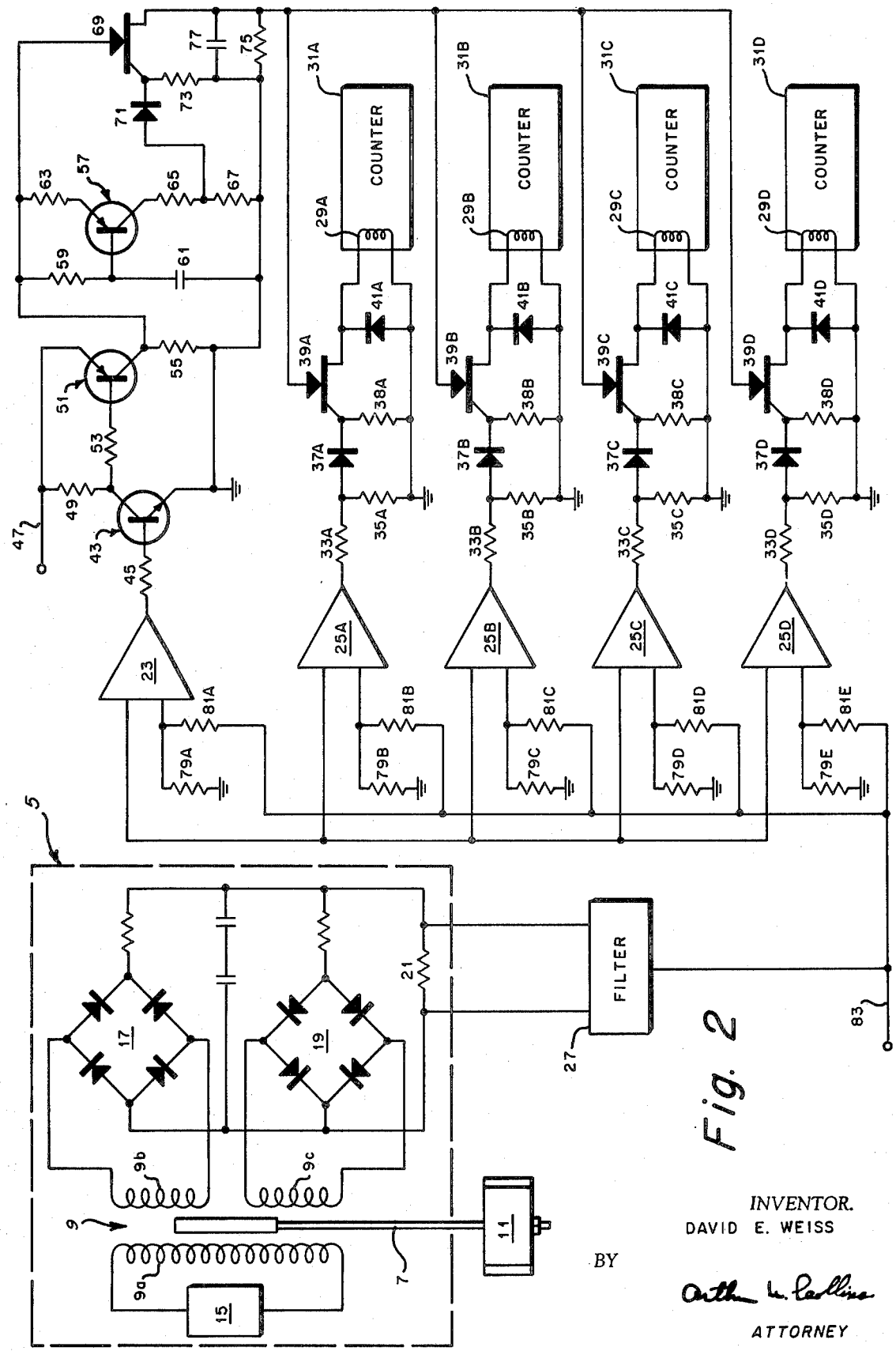
FIG. 2 is a schematic diagram of the electrical circuitry of the invention shown in FIG. 1.

Referring now to the various figures of the drawing, it will be understood that the structure 3 which is to be monitored for fatigue damage in accordance with the invention may consist of any member or any plurality of interconnected members which are repeatedly subjected to compressive or tensile strains of variable magnitude. The transducer device 5, which converts relative linear movement of predetermined separated points on the structure 3 into proportional electrical pulses, includes a ferromagnetic rod or armature 7 and the various coils and associated circuits of the linear differential transformer 9. The ferromagnetic rod 7 is preferably threadedly mounted in the support member 11, which is secured to the structure 3 at one selected point thereon in any suitable manner. Locking nuts 13 adjustably determine the longitudinal axial disposition of the rod 7 in the support member 11.

The primary coil 9a of the linear differential transformer 9 is wound on a suitable coil form and is preferably energized by a conventional multivibrator-type oscillator circuit 15. The secondary windings 9b and 9c are concentrically mounted on the coil form with respect to the primary winding and are axially disposed thereon with respect to one another. The ferromagnetic rod 7 is positioned within the coil form and controls the electromagnetic coupling between the primary and secondary coils. Although the portion of the rod 7 within the coil form is constructed of a material that exhibits suitable ferromagnetic properties, other portions of the rod are preferably made of a material or materials such as aluminum and/or brass that expand and contract during changes in ambient temperature and compensate for similar expansions and contractions of the structure 3. Opposite ends of the secondary coils 9b and 9c are respectively coupled to the full wave rectifier circuits 17 and 19 and develop bucking potentials across output resistor 21. The various coils and associated circuits of the linear differential transformer 9 are secured as a unit to another selected point on the structure 3 by support member 12 in any suitable conventional manner.

The output resistor 21 of the strain sensor and transducer unit 5 is coupled to the reset comparator circuit 23 and he various other parallel connected strain level comparator circuits 25A–25D through the 0–2.5 c.p.s. band pass filter 27. The output circuit of each of the strain level comparator circuits 25A 25D is coupled to the energizing coil 29A–29D of its associated counter device 31A–31D through resistors 33A–33D and 35A–35D, diode 37A–37D, resistor 38A–38D, and the plate to cathode circuit of the silicon control rectifier 39A–39D. The diode 41A–41D across the energizing coil 4 of each counter protects the associated SCR circuit from undesired negative voltage spikelike pulses developed thereacross.

The output circuit of the reset comparator circuit 23 is coupled to the base of the transistor 43 through resistor 45. The collector-emitter circuit of transistor 43 extends from the positive 28 volt DC power supply line 47 through resistor 49 and the transistor 43 to ground. The collector of transistor 43 is connected to the base of transistor 51 through resistor 53. The collector-emitter circuit of transistor 51 extends from the power supply line 47 through the transistor 51 and resistor 55 to ground. The collector of transistor 51 is coupled to the base of transistor 57 through resistor 59 and condenser 61. The collector-emitter circuit of transistor 57 extends from the collector of transistor 51 through resistor 63, the transistor 57, and resistors 65 and 67 to ground. The junction of resistors 65 and 67 is coupled to the gate of the silicon control rectifier 69 through diode 71 and resistor 73. The plate to cathode circuit of SCR 69 extends from the collector of transistor 51 through the SCR and through the parallel connection of transistor 75 and condenser 77 to ground. The junction of resistors 73 and 75 is connected to the plate of the SCR 39A–39D for each counter circuit.

Inasmuch as the details of each of the comparator circuits 23 and 25A–25D form no part of the invention, circuit details of the same are not included herein for the sake of simplicity. For a complete understanding of the invention, it need only be understood that control of the reference voltage, with which the input voltage from the strain sensor circuitry is compared, is obtained by suitable selection of resistors 79A–79E and 81A–81E across the positive DC supply line 83. The opposite polarity stain signal input and reference voltages are summed in a conventional high-gain operational or differential amplifier so as to provide a positive output pulse when the input signal exceeds to reference potential.

In operation, the ferromagnetic rod 7 and the coil assembly of transducer 5 are mounted at predetermined separated points as the structure 3. The axial position of the rod 7 is then adjusted in its support member 11 such that, when no load is applied to the structure, the electromagnetic coupling between the primary coil 9a of the transducer 5 and its secondary coils 9b and 9c is equalized. Thus, at no load, equal and opposite AC potentials are induced in coils 9b and 9c by the primary multivibrator oscillator circuit 15. These potentials are rectified in the full wave rectifier circuits 17 and 19 and applied across output resistor 21 such that no effective output signal is developed by transducer 5.

When tensile and/or compressive strains are applied to the structure 3, resulting axial movement of the rod 7 increases the coupling to one transducer secondary coil and decreases the coupling to the other coil. When this occurs, a potential proportional to the magnitude of the axial movement of the rod 7 is developed across output resistor 21. This potential is then fed through the filter network 27 to the various differential amplifier comparator circuits 23 and 25A–25D. The filter 27 attenuates all vibratory and other extraneous transducer output potentials which have a frequency that exceeds 2.5 c.p.s.

Prior to the application of the potential from transducer 5, reset comparator 23 develops a negative output potential which maintains transistors 43, 51 and 57 and SCR 69 cut off. Similarly, until the transducer output signal is developed, comparators 25A–25D provide a negative output potential on the gate of SCR 39A–39D that cuts off the SCR and maintains the energizing coil 29A–29D of the various associated counters deenergized. Resistors 81A–81E are preselected so as to provide comparator input reference voltages that increase from a predetermined minimum magnitude for the reset comparator 23 in predetermined steps for the other comparators 25A–25D.

When the potential or signal from the transducer 5 exceeds the potential of any of the reference voltages of comparators 25A–25D, a positive pulse is applied to the gate of its associated SCR 39A–39D and the associated counter energizing coil 29A–29D is preconditioned for energization. When the potential from transducer 5 exceeds the potential of any of the reference voltages of comparators 25A'25D, it also exceeds the potential of the minimum reference voltage of reset comparator 23 and a positive pulse is applied to the base of transistor 43. This energizes transistor 43 and applies a negative pulse to the base of transistor 51. Transistor 51 is then energized and practically the full 28 volts of power supply line 47 is applied to the RC delay network of resistor 59 and condenser 61. After a predetermined interval of approximately 200 milliseconds, condenser 61 charges to a point where the base of transistor 57 is forwardly biased and transistor 57 is energized. Energization of transistor 57 provides a positive pulse on the gate of SCR 69, which then inturn applies a positive pulse on the gate of each SCR 39A–39D. The various SCR's 39A–39D which were preconditioned for energization by their respective comparators 25A–25D are then energized and the energizing coil of the associated counter registers the strain on the structure. The delay in the application of the pulse at the gate of each SCR 39A–39D produced by the RC charging circuit of resistor 59 and condenser 61 further suppresses spurious oscillations and pulses in the circuitry that are not developed by actual strains in the structure 3.

The exact distance between points where the ferromagnetic rod 7 and the coil assembly of the transducer 5 is measured carefully and the impedances of resistors 81A–81E of the comparator circuits and other parameters of the apparatus are preferably suitably adjusted so that the various strain levels registered in the counting devices are obtained directly in the desired units of strain.

Obviously, many modifications and variations of the present invention are possible in the light of the above teachings. It is therefore to be understood that within the scope of the appended claims, the invention may be practiced otherwise than as specifically described.

What is claimed is:

1. Apparatus for measuring fatigue in a structure, said apparatus comprising:
   a. a strain sensor which is secured to the structure and develops an electrical pulse proportional to strains imposed on the structure;
   b. a device which is coupled to the strain sensor and passes electrical pulses from the strain sensor that exceed a predetermined threshold magnitude;
   c. and a device for recording the number of times the electrical pulses from the strain sensor exceed the threshold magnitude, said recording device including a silicon control rectifier which includes means to filter out spurious high-frequency oscillations.

2. Apparatus substantially as described in claim 1 wherein the recording device includes:
   a. a gating circuit which is coupled to the output of the device that passes pulses that exceed the threshold magnitude and which is preconditioned for energization thereby;
   b. means for energizing the gating circuit when it is preconditioned for energization a predetermined interval after the occurrence of a passing pulse;
   c. and a counter coupled to the output of the gating circuit.

* * * * *